United States Patent
Hihn et al.

(10) Patent No.: US 6,964,708 B2
(45) Date of Patent: Nov. 15, 2005

(54) BOOTH FOR COATING OBJECTS WITH POWDER

(75) Inventors: Erwin Hihn, Walddorfhäslach (DE); Wolfgang Bezner, Schönaich (DE)

(73) Assignee: Eisenmann Maschinenbau KG (DE)

( * ) Notice: Subject to any disclaimer, the term of this patent is extended or adjusted under 35 U.S.C. 154(b) by 0 days.

(21) Appl. No.: 10/379,371

(22) Filed: Mar. 4, 2003

(65) Prior Publication Data

US 2003/0192472 A1 Oct. 16, 2003

(30) Foreign Application Priority Data

Mar. 5, 2002 (DE) .......................................... 102 09 489

(51) Int. Cl.7 ............................................. B05B 15/12
(52) U.S. Cl. ...................... 118/326; 118/308; 118/309; 118/310; 118/311; 454/50; 454/51; 454/52; 454/53
(58) Field of Search .............. 454/50–55; 118/308–311, 118/326

(56) References Cited

U.S. PATENT DOCUMENTS

| | | | | |
|---|---|---|---|---|
| 2,119,282 A | * | 5/1938 | Ludwig ....................... | 454/52 |
| 4,952,221 A | * | 8/1990 | Morioka ...................... | 96/324 |
| 5,690,995 A | * | 11/1997 | Fischli et al. ................ | 427/180 |
| 5,769,703 A | * | 6/1998 | Conlin ......................... | 454/50 |
| 5,855,509 A | * | 1/1999 | White et al. .................. | 454/52 |
| 6,010,571 A | * | 1/2000 | Josefsson et al. ............ | 118/326 |
| 6,616,764 B2 | * | 9/2003 | Kramer et al. ............... | 118/326 |

FOREIGN PATENT DOCUMENTS

| | | |
|---|---|---|
| DE | 41 16 897 A1 | 11/1992 |
| DE | 42 23 819 A1 | 1/1994 |
| DE | 295 18 615 U1 | 2/1996 |
| EP | 0 216 482 | 10/1989 |
| WO | WO95/28233 | 10/1995 |

\* cited by examiner

*Primary Examiner*—Chris Fiorilla
*Assistant Examiner*—Michelle Acevedo Lazor
(74) *Attorney, Agent, or Firm*—Factor & Lake

(57) ABSTRACT

A booth for coating objects with powder, in particular for powder painting, comprises in a manner known per se a housing, in which there is situated at least one application device, with which powder can be applied to the objects. Situated in the upper region of the housing is an air plenum, which is fed with supply air via an inlet opening. The air plenum is closed off downwardly by a filter ceiling. In contrast to known filter ceilings, the one according to the invention is air-permeable in its marginal region only, while in its central region it consists of air-impermeable material. The supply air is thus introduced into the interior of the booth as a kind of "air curtain" which flows mainly along the side walls of the housing of the booth, entrains in the process stray excess powder which has not adhered to the objects to be coated, and supplies it to at least one extraction opening situated in the bottom of the booth. This extraction opening leads to a filter unit which, for its part, is connected to an extraction fan and in which the powder present in the air/powder mixture can be separated off and passed on for reuse. The effects achieved by the special design of the filter ceiling are that less turbulence forms in the coating region, no particles falling off from the filter ceiling can lead to coating defects and, on changing the filters contained in the filter ceiling, there is less fouling of the booth.

4 Claims, 1 Drawing Sheet

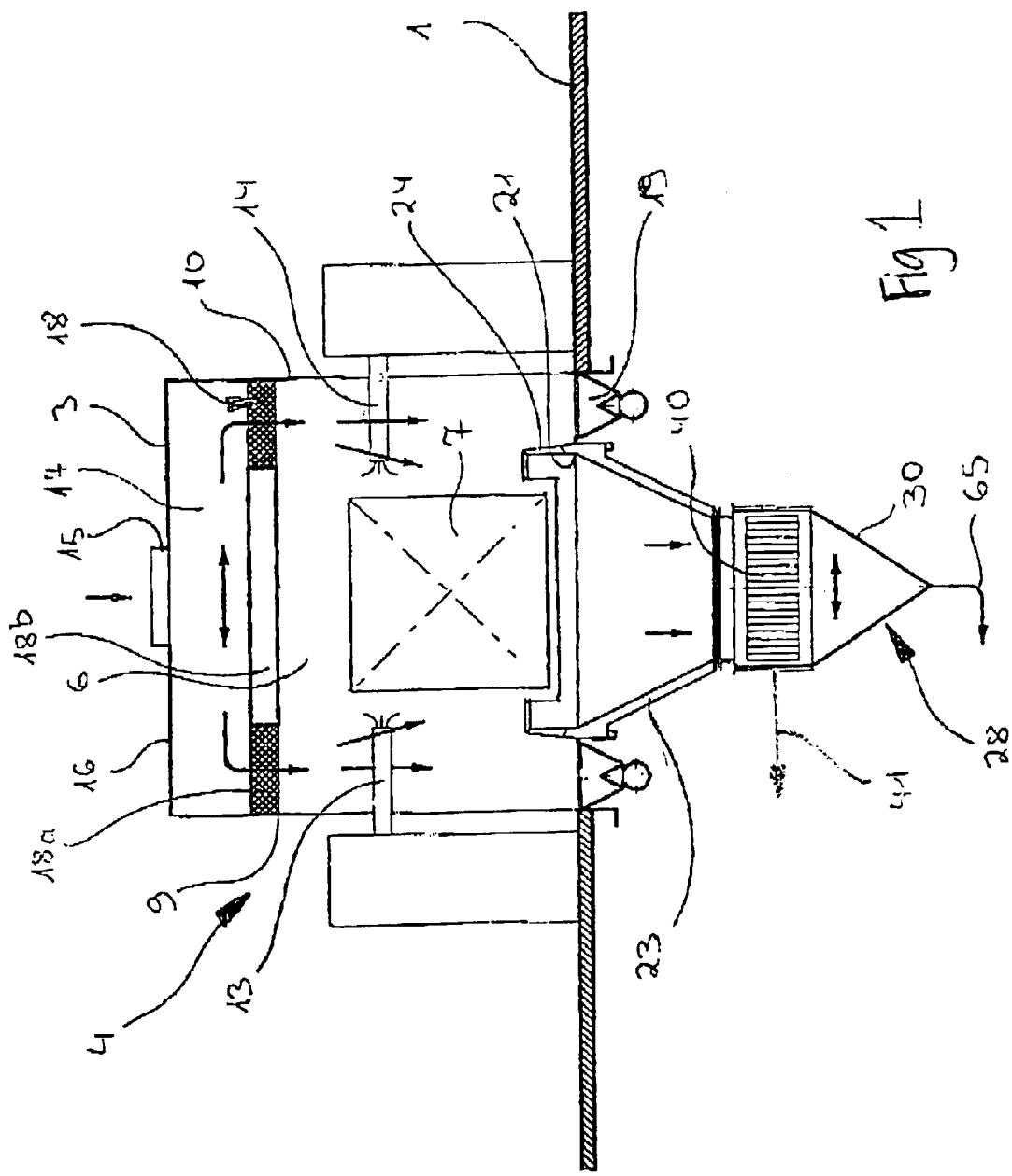

BOOTH FOR COATING OBJECTS WITH POWDER

BACKGROUND OF THE INVENTION

The invention relates to a booth for coating objects with powder, in particular for powder painting, having a) a housing, in the upper region of which there is formed an air plenum, which can be charged with supply air via an inlet and is bounded downwardly by a filter ceiling;

b) at least one application device in the housing, with which device powder can be applied to the objects; and c) at least one extraction opening in the lower region of the housing, via which opening a mixture of air and excess powder can be extracted and supplied to a recovery unit.

In the coating of objects with powder, in particular in powder painting, it is unavoidable that a considerable part of the powder does not adhere to the objects. To recover this excess powder, also referred to as "overspray", it is known to direct an air stream through the interior of the booth from the top downwards, which takes up the excess powder. The resulting air/powder mixture is extracted via at least one extraction opening in the lower region of the booth and supplied to a filter unit. The powder is separated off in the latter in order to be passed on for reuse. In this way, considerable cost savings in the powder consumption can be achieved.

Known booths of the type mentioned at the outset have a filter ceiling which is more or less uniformly air-permeable over its entire area and is covered with corresponding filter mats. The idea here was to produce an as far as possible uniform air flow in the interior of the booth from the top downwards. However, it has turned out that these known filter ceilings constitute a certain risk of fouling and cause air turbulence at the objects to be coated, which may impair the coating result.

The object of the invention is to further develop a booth of the type mentioned at the outset such that the coating result is improved.

This object is achieved in that d) the filter ceiling is air-permeable in a marginal region only and in its central region consists of air-impermeable material.

SUMMARY OF THE INVENTION

The present invention shows that it is not only unnecessary but may even be detrimental to produce an air flow running from the top downwards in the central region of the booth in which the workpieces to be coated are situated. On flowing round the objects, this would simply lead to air turbulence, which may have a detrimental effect on the quality of the coating. In the known filter ceilings permeable over their entire area, there was also the possibility that particles might become detached from the charged filters and fall down onto the coated objects, likewise leading to impairment of the surface quality. Finally, changing the filter in the known filter ceilings involved considerable fouling of the entire booth.

According to the invention, essentially only air curtains close to the walls are employed which do not blow frontally against the objects to be coated, but in fact clean the walls of the booth and are comparable to the known air streams extending over the entire cross-section of the booth in their effectiveness at removing, the excess powder.

It is expedient for the filter ceiling to consist of electrically non-conductive material in its central region. This material does not attract the powder, which is generally electrically charged for coating purposes, so that there is no possibility of powder adhering in the central region of the filter ceiling either. It is thus not possible for particles from this central region of the filter ceiling located above the objects to be coated to fall down onto the objects.

The filter ceiling advantageously consists of plastic in its central region.

In a particularly preferred embodiment of the invention, there is arranged on the bottom of the booth an upwardly projecting apron which surrounds the at least one extraction opening, it being the case that, outside the apron, an extraction channel runs at least along part of the walls, via which channel the air/powder mixture close to the walls can be passed on for disposal. This apron therefore subdivides the total flow of the air/powder mixture into two partial streams: the partial stream close to the walls, which is generally more heavily contaminated, is removed via the extraction channel and discarded, while the generally cleaner part, lying further to the inside of the air/powder mixture is passed on for reuse. Through the position and height of the apron, it is possible to influence the proportions of the total flow of the air/powder mixture which are distributed between the two partial streams.

The proportions of the two mixture flows can also be governed by varying the suction in the extraction channel and in the extraction opening leading on to reuse.

It is of advantage here for the apron to be extended upwards to such a degree that it surrounds at least the lower region of the objects to be coated. In this way, the velocity of the air/powder mixture in the gap between the workpiece and the apron can be increased as required.

BRIEF DESCRIPTION OF THE DRAWINGS

An exemplary embodiment of the invention is explained in more detail below with reference to the drawing:

FIG. 1 Schematically shows a powder painting booth.

DETAILED DESCRIPTION OF THE DRAWINGS

The powder painting booth is provided, as a whole, with the reference numeral 4 in the drawing. It comprises a substantially cuboid-shaped housing 3 with closable doors (not illustrated in the drawing) which are provided in the end faces 6 and via which the objects 7 to be coated are brought into the interior of the housing 3 and moved out of the housing 3 again with the aid of a conveying system (not illustrated). In the opposite side walls 9, 10 of the housing 3 which run parallel to the conveying direction, there are provided openings through which application devices 13, 14 project into the interior of the housing 3. The application devices 13, 14 deliver the coating powder to the objects 7 to be coated while the latter are moving or during stationary periods.

To remove the excess powder which is not deposited on the objects 7, an air flow, indicated by arrows, is maintained in the interior of the housing 3 of the powder painting booth 4. This air flow starts at the top in an air plenum 17, which is fed with supply air via an inlet opening 15 in the upper side 16 of the housing 3. The air plenum 17 is bounded downwardly by a filter ceiling 18. The filter ceiling 18 has a marginal region 18a which extends along the walls 6, 9, 10 of the housing 3 and in which there is arranged in a known manner filter material, via which the supply air can leave the air plenum 17. In contrast, the central region 18b of the filter ceiling 18 consists of non-conductive plastic and is air-impermeable.

The effect achieved by the described design of the filter ceiling 18 is that the supply air leaves the air plenum 17 in the direction of the interior of the housing 3 located therebelow not as an air stream covering the whole area but merely in the form of a kind of "air curtain" extending substantially along the walls 6, 9, 10 of the powder booth 4. The central, air-impermeable region 18b, in contrast, substantially covers the objects 7. The latter are therefore not subjected to a frontal flow against their upper side. Since the central region 18b of the filter ceiling 18 consists of non-conductive material, the powder particles, which are electrically charged in the application devices 13, 14 for coating purposes, do not tend to be deposited in this central region 18b of the filter ceiling 18. There is thus also no risk of particles falling off from this central region 18b onto the possibly freshly coated objects 7 situated directly therebelow.

Running along the walls 6, 9, 10 of the housing 3, in the bottom of the powder painting booth 4, is an extraction channel 19 which is connected to a central fan of the powder painting booth 4, which fan, for its part, passes on the powder extracted here for disposal as waste.

Situated in the central region in the bottom of the powder painting booth 4 is a relatively large-area extraction opening 21, to which an extraction funnel 23 is downwardly connected. A filter unit 28 is leaktightly flanged to the lower opening of the extraction funnel 23. This filter unit 28 contains a filter 40 which retains the powder present in the supplied air/powder mixture. The air is extracted via a line 41, while the powder falls down into the lower section, tapering in a funnel shape, of the housing 30 of the filter unit 28 and can be transferred via a line 65 into a collecting container, in which the powder can be kept ready for reuse.

The above-described powder painting booth works as follows:

In operation, the objects 7 to be coated are brought, with the aid of the conveying system (not illustrated) via the door in one of the end walls 6 of the housing 3, into the interior of the housing 3 and coated there with the aid of the application devices 13, 14. The excess powder which does not adhere to the objects 7 comes into the air curtains flowing from the top downwards along the walls 6, 9, 10 of the housing 3, out of the marginal regions 18a of the filter ceiling. The resulting total flow of air and powder is divided by the apron 24 into two portions: the portion close to the walls, which experience shows is more heavily contaminated, passes into the extraction channel 19 and is passed on for disposal as mentioned above. The inner portion of the air/powder mixture, in contrast, passes via the extraction opening 21 into the extraction funnel 23 and from there into the filter unit 28, where the powder is separated off and passed on via the line 65 for reuse.

Through the position and height of the apron 24, it is possible to influence the proportion of the total flow of air and powder which is passed on for disposal or reuse. By extending the apron 24 upwards to such a degree that it surrounds the lower region of the objects 7 to be coated, a gap is created here, that is to say a narrowing of the flow path, in which the flow velocity of the air/powder mixture increases. Subjecting the objects 7 to be coated to such a flow against them in the lower region is desirable in many cases. The magnitude of the velocity prevailing in the gap can be influenced here by selecting the width of the spacing between the apron 24 and the outer contour of the object 7.

What is claimed is:

1. Booth for coating objects with powder, in particular for powder painting, having
    a) a housing, in an upper region of which there is formed an air plenum, which can be charged with supply air via an inlet and is bounded downwardly by a filter ceiling, the housing having one or more walls;
    b) at least one application device in the housing, with which device powder can be applied to objects;
    c) at least one first extraction opening in a lower region of the housing, running along at least part of the one or more walls, via which opening a mixture of air and excess powder can be extracted and supplied to a recovery unit;
    d) at least one second extraction opening in a central region of the lower region of the housing, and adjacent the at least one first extraction opening, via which a mixture of air and excess powder can be extracted, filtered, and reused;
    e) the filter ceiling having a central region and a marginal region, wherein the central region consists of air-impermeable material such that the filter ceiling is air-permeable in the marginal region only, which marginal region is adjacent to walls of the housing; and
    f) an upwardly projecting apron separating the at least one first extraction opening and the at least one second extraction opening, wherein the apron partitions the total flow of air/powder mixture between the first extraction opening and the second extraction opening and wherein the position of the apron is adjustable so as to enable proportion of the total flow of air/powder mixture between the first extraction opening and the second extraction opening to be altered.

2. Booth according to claim 1, wherein the filter ceiling consists of electrically non-conductive material in its central region.

3. Booth according to claim 2, wherein the filter ceiling consists of plastic in its central region.

4. Booth according to claim 1, wherein the apron is extended upwards to such a degree that it surrounds at least a lower region of the objects to be coated.

* * * * *

UNITED STATES PATENT AND TRADEMARK OFFICE
CERTIFICATE OF CORRECTION

PATENT NO. : 6,964,708 B2
DATED : November 15, 2005
INVENTOR(S) : Hihn et al.

It is certified that error appears in the above-identified patent and that said Letters Patent is hereby corrected as shown below:

Title page,
Item [73], Assignee, should read -- Eisenmann Maschinenbau KG DE (Komplementar: Eisenmann-Stiftung) --.
Item [30], Foreign Application Priority Data, should read
-- Mar. 5, 2002 (DE) ..................... 102 09 489.6 --.

Signed and Sealed this

Fourteenth Day of February, 2006

JON W. DUDAS
*Director of the United States Patent and Trademark Office*